US012613632B2

(12) United States Patent (10) Patent No.: US 12,613,632 B2
Shatsky et al. (45) Date of Patent: Apr. 28, 2026

(54) STORAGE CAPACITY TRACKING IN STORAGE SYSTEMS

(71) Applicant: Dell Products L.P., Round Rock, TX (US)

(72) Inventors: Yosef Shatsky, Karnei Shomron (IL); Doron Tal, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/802,707

(22) Filed: Aug. 13, 2024

(65) Prior Publication Data

US 2026/0050378 A1 Feb. 19, 2026

(51) Int. Cl.
*G06F 3/06* (2006.01)

(52) U.S. Cl.
CPC ............ *G06F 3/061* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 8,311,964 B1 * | 11/2012 | Efstathopoulos | ..... | G06F 3/0641 |
| | | | | 706/45 |
| 9,514,211 B2 * | 12/2016 | Sengupta | ............ | G06F 16/2282 |
| 10,452,792 B1 * | 10/2019 | Flaherty | ................ | G06F 3/0653 |
| 2009/0064159 A1 * | 3/2009 | LaFrese | ................ | G06F 3/0686 |
| | | | | 718/104 |

| | | | | |
|---|---|---|---|---|
| 2017/0308305 A1 * | 10/2017 | Goel | ..................... | G06F 3/0641 |
| 2019/0370357 A1 * | 12/2019 | Kucherov | ........... | G06F 16/9014 |
| 2022/0129159 A1 * | 4/2022 | Randall | ................... | G06F 3/067 |
| 2022/0342556 A1 * | 10/2022 | Dimnaku | ........... | G06F 11/3433 |

OTHER PUBLICATIONS

S. Ghosh et al., "Blind Updates in Coded Caching," arXiv:2010. 10464v2, May 15, 2021, 35 pages.
B. Chandramouli et al., "Faster: A Concurrent Key-Value Store with In-Place Updates," Proceedings of the 2018 International Conference on Management of Data, May 27, 2018, 16 pages.
D. Lomet, "Cost/Performance in Modern Data Stores," Proceedings of the 14th International Workshop on Data Management on New Hardware, Jun. 11, 2018, 10 pages.

* cited by examiner

*Primary Examiner* — Jared I Rutz
*Assistant Examiner* — Alexander J Yoon
(74) *Attorney, Agent, or Firm* — Ryan, Mason & Lewis, LLP

(57) ABSTRACT

An apparatus comprises at least one processing device configured to monitor write request operations directed to at least one storage volume of a storage system, and to identify, utilizing a sampling rate determined based at least in part on a volume size of the storage volume, a subset of the write request operations. The at least one processing device is also configured to determine changes to storage capacity counters for portions of the storage volume that are written to by the subset of the write request operations, to generate estimates for overall storage capacity counters for the storage volume based on (i) the determined changes to the storage capacity counters for the portions of the storage volume that are written to by the subset of the write request operations and (ii) the sampling rate, and to adjust characteristics of the storage system based on the generated estimates.

20 Claims, 5 Drawing Sheets

200

| VOLUME SIZE | 8 GIGABYTES (GB) | 128GB | 1 TERABYTE (TB) | 10TB |
|---|---|---|---|---|
| SAMPLING RATE | 1:2000 | 1:2000 | 1:8000 | 1:8000 |
| MARGIN OF ERROR | 12.2% | 4.3% | 0.8% | 0.2% |

FIG. 2

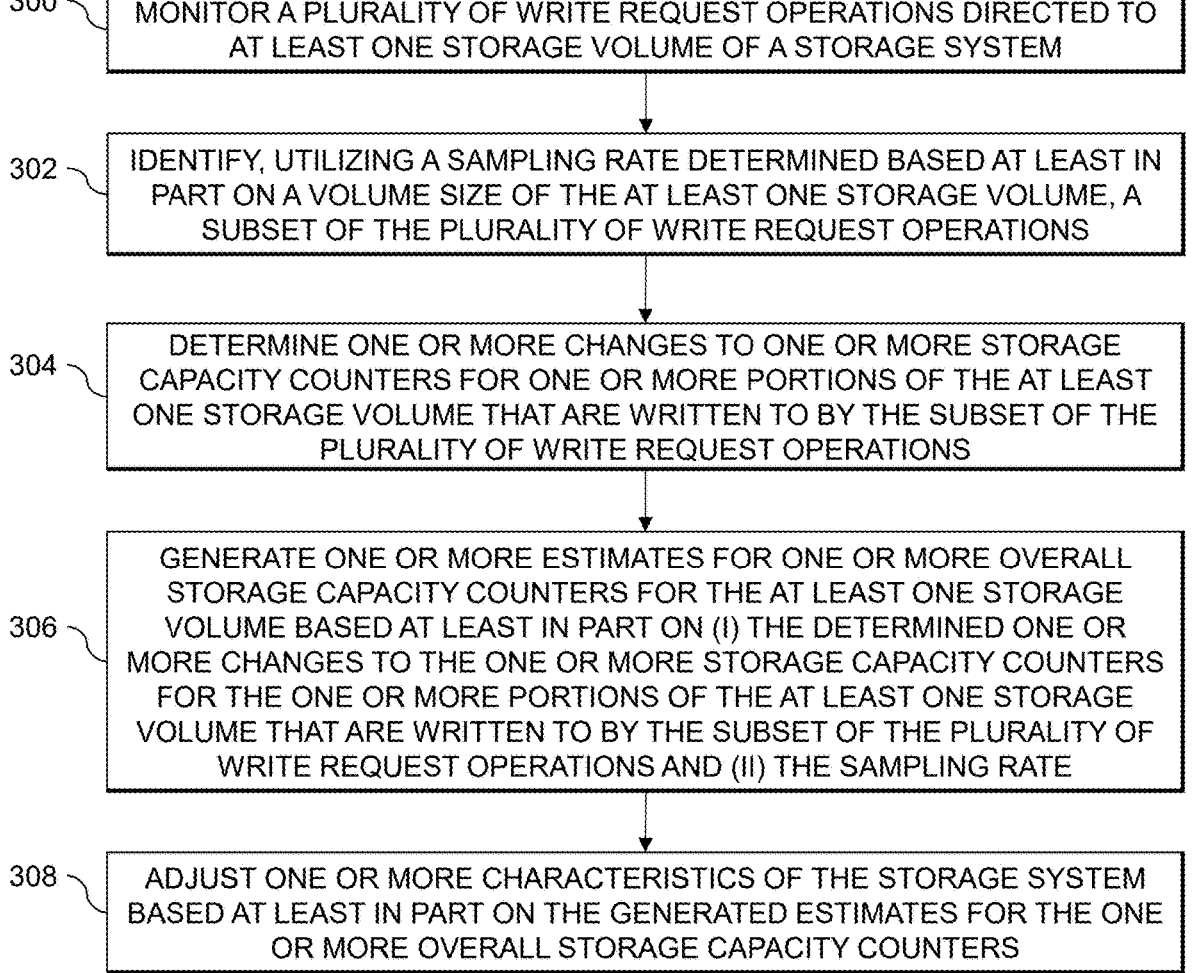

300 — MONITOR A PLURALITY OF WRITE REQUEST OPERATIONS DIRECTED TO AT LEAST ONE STORAGE VOLUME OF A STORAGE SYSTEM

302 — IDENTIFY, UTILIZING A SAMPLING RATE DETERMINED BASED AT LEAST IN PART ON A VOLUME SIZE OF THE AT LEAST ONE STORAGE VOLUME, A SUBSET OF THE PLURALITY OF WRITE REQUEST OPERATIONS

304 — DETERMINE ONE OR MORE CHANGES TO ONE OR MORE STORAGE CAPACITY COUNTERS FOR ONE OR MORE PORTIONS OF THE AT LEAST ONE STORAGE VOLUME THAT ARE WRITTEN TO BY THE SUBSET OF THE PLURALITY OF WRITE REQUEST OPERATIONS

306 — GENERATE ONE OR MORE ESTIMATES FOR ONE OR MORE OVERALL STORAGE CAPACITY COUNTERS FOR THE AT LEAST ONE STORAGE VOLUME BASED AT LEAST IN PART ON (I) THE DETERMINED ONE OR MORE CHANGES TO THE ONE OR MORE STORAGE CAPACITY COUNTERS FOR THE ONE OR MORE PORTIONS OF THE AT LEAST ONE STORAGE VOLUME THAT ARE WRITTEN TO BY THE SUBSET OF THE PLURALITY OF WRITE REQUEST OPERATIONS AND (II) THE SAMPLING RATE

308 — ADJUST ONE OR MORE CHARACTERISTICS OF THE STORAGE SYSTEM BASED AT LEAST IN PART ON THE GENERATED ESTIMATES FOR THE ONE OR MORE OVERALL STORAGE CAPACITY COUNTERS

FIG. 3

STORAGE CAPACITY TRACKING IN STORAGE SYSTEMS

BACKGROUND

Information processing systems often include distributed arrangements of multiple nodes, also referred to herein as distributed processing systems. Such systems can include, for example, distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. Data within the system is partitioned, striped, and replicated across the distributed storage nodes. For a storage administrator, the software-defined storage system provides a logical view of a given dynamic storage pool that can be expanded or contracted at ease, with simplicity, flexibility, and different performance characteristics. For applications running on a host device that utilizes the software-defined storage system, such a storage system provides a logical storage object view to allow a given application to store and access data, without the application being aware that the data is being dynamically distributed among different storage nodes potentially at different sites.

SUMMARY

Illustrative embodiments of the present disclosure provide techniques for storage capacity tracking in storage systems.

In one embodiment, an apparatus comprises at least one processing device comprising a processor coupled to a memory. The at least one processing device is configured to monitor a plurality of write request operations directed to at least one storage volume of a storage system, and to identify, utilizing a sampling rate determined based at least in part on a volume size of the at least one storage volume, a subset of the plurality of write request operations. The at least one processing device is also configured to determine one or more changes to one or more storage capacity counters for one or more portions of the at least one storage volume that are written to by the subset of the plurality of write request operations, and to generate one or more estimates for one or more overall storage capacity counters for the at least one storage volume based at least in part on (i) the determined one or more changes to the one or more storage capacity counters for the one or more portions of the at least one storage volume that are written to by the subset of the plurality of write request operations and (ii) the sampling rate. The at least one processing device is further configured to adjust one or more characteristics of the storage system based at least in part on the generated estimates for the one or more overall storage capacity counters.

These and other illustrative embodiments include, without limitation, methods, apparatus, networks, systems and processor-readable storage media.

BRIEF DESCRIPTION OF THE DRAWINGS

FIG. 2 shows a table of sampling rates and margins or error for different volume sizes in an illustrative embodiment.

FIG. 3 is a flow diagram of an exemplary process for storage capacity tracking in storage systems in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
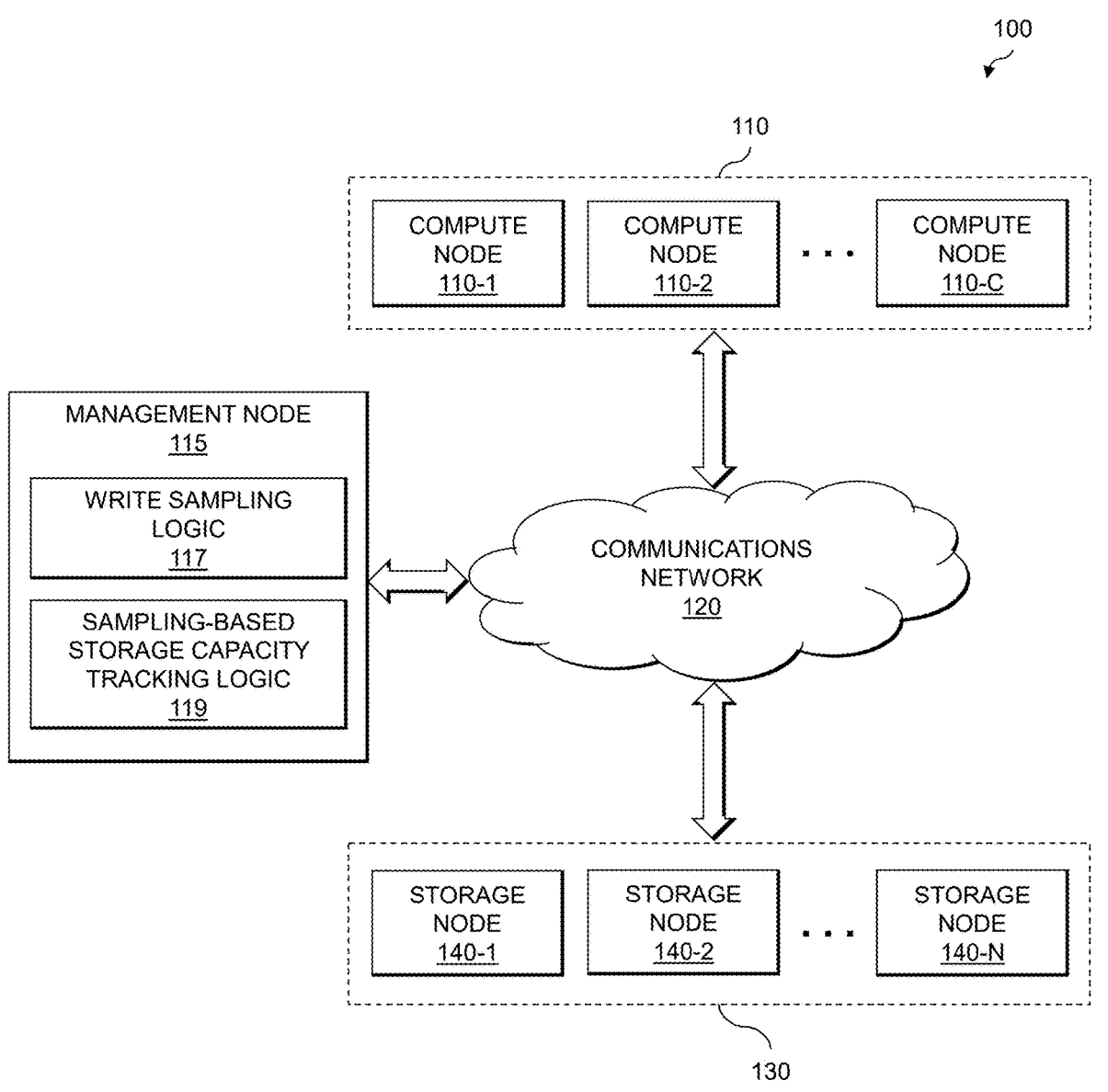
FIGS. 1A and 1B are block diagrams of an information processing system configured for storage capacity tracking in a data storage system in an illustrative embodiment.
Figure 1B:
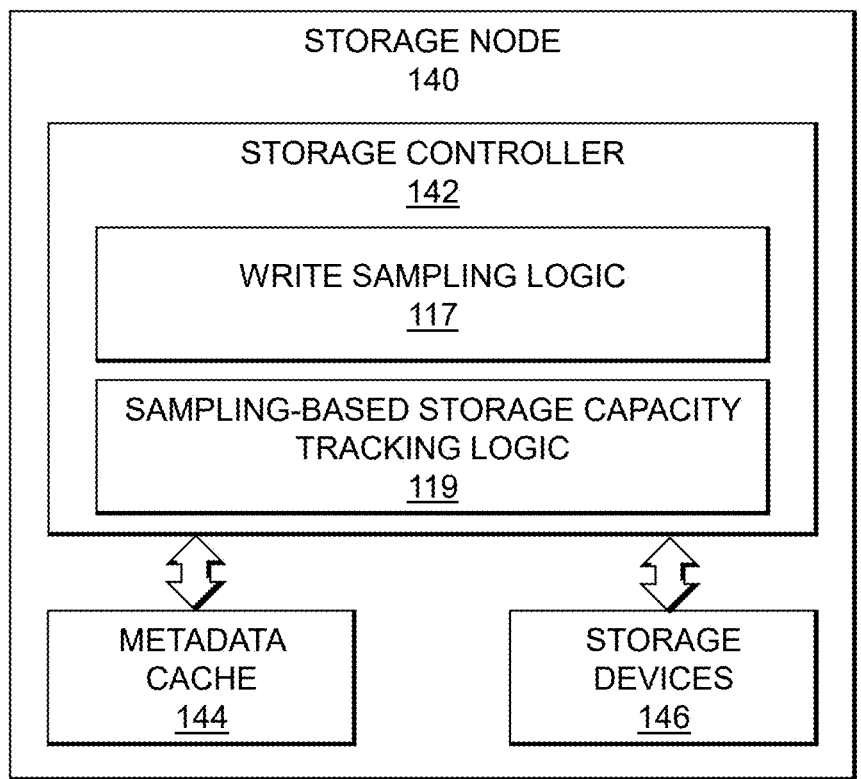

FIGS. 1A and 1B schematically illustrate an information processing system which is configured to implement functionality for storage capacity tracking in storage systems according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, . . . , 140-N (collectively referred to as storage nodes 140, or each singularly referred to as a storage node 140). In the context of the exemplary embodiments described herein, the management nodes 115 and the data storage system 130 implement write sampling logic 117 and sampling-based storage capacity tracking logic 119 supporting the efficient tracking of storage capacity utilization in the data storage system 130. FIG. 1B schematically illustrates an exemplary framework of at least one or more of the storage nodes 140.

In particular, as shown in FIG. 1B, the storage node 140 comprises a storage controller 142, a metadata cache 144 and a plurality of storage devices 146. In general, the storage controller 142 implements data storage and management methods that are configured to divide the storage capacity of the storage devices 146 into storage pools and logical volumes. Storage controller 142 is further configured to implement the write sampling logic 117 and the sampling-based storage capacity tracking logic 119 in accordance with the disclosed embodiments, as will be described in further detail below. Various other examples are possible. It is to be noted that the storage controller 142 may include additional modules and other components typically found in conventional implementations of storage controllers and storage systems, although such additional modules and other components are omitted for clarity and simplicity of illustration.

In the embodiment of FIGS. 1A and 1B, the write sampling logic 117 and the sampling-based storage capacity tracking logic 119 may be implemented at least in part within the one or more management nodes 115 as well as in one or more of the storage nodes 140 of the data storage system 130. This may include implementing different portions of the write sampling logic 117 and the sampling-based storage capacity tracking logic 119 functionality described herein being implemented within the management nodes 115 and the storage nodes 140. In other embodiments, however, the write sampling logic 117 and the sampling-based storage capacity tracking logic 119 may be implemented entirely within the management nodes 115 or entirely within the storage nodes 140. In still other embodiments, at least a portion of the functionality of the write sampling logic 117 and the sampling-based storage capacity tracking logic 119 is implemented in one or more of the compute nodes 110.

The compute nodes 110 illustratively comprise physical compute nodes and/or virtual compute nodes which process data and execute workloads. For example, the compute nodes 110 can include one or more servers (e.g., bare metal servers) and/or one or more virtual machines. In some embodiments, the compute nodes 110 comprise a cluster of physical servers or other types of computers of an enterprise computer system, cloud-based computing system or other arrangement of multiple compute nodes associated with respective users. In some embodiments, the compute nodes 110 include a cluster of virtual machines that execute on one or more physical servers.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (IO) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCOE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such as non-volatile random access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network. The metadata cache 144 may be implemented using memory resources.

The storage controller 142 is configured to manage the metadata cache 144 and the storage devices 146, and to control IO access to the metadata cache 144, the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node

140, and is configured to respond to data IO requests from the compute nodes 110 by accessing the storage devices 146 to store/retrieve data to/from the storage devices 146 based on the IO requests. Processing of the data IO requests may utilize various metadata, which may be stored in the meta-data cache 144 (e.g., for faster access) or in the storage devices 146 themselves.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., which instances of the storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various function as follows. In particular, a storage virtualization and management services module may implement any suitable logical volume management (LVM) system which is configured to create and manage local storage volumes by aggregating the local storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating compute nodes 110, applications running on compute nodes 110). Performance may refer to latency, or other metrics such as IO operations per second (IOPS), bandwidth, etc. Advanced data service features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Device tiering may be used in some storage systems, such as in storage systems that contain some relatively "fast" and expensive storage devices and some relatively "slow" and less expensive storage devices. In device tiering, the "fast" devices may be used when performance is the primary requirement, where the "slow" and less expensive devices may be used when capacity is the primary requirement. Such device tiering may also use cloud storage as the "slow" device tier. Some storage systems may also or alternately separate devices offering the same performance level to gain performance isolation between different sets of storage volumes. For example, the storage systems may separate the "fast" devices into different groups to gain performance isolation between storage volumes on such different groups of the "fast" devices.

One of the technical challenges in a storage system's data path relates to managing metadata which is required to map from a location in a volume (or file) to a location on one or more physical storage drives. Given the capacity (e.g., storage devices 146) that a storage node (e.g., storage node 140) contains relative to the amount of memory, it is not possible for all the metadata to reside in memory (e.g., RAM). This is solved by having a metadata cache (e.g., metadata cache 144) that swaps metadata in and out of memory (e.g., RAM) based on the workloads which are running.

To handle IO requests directed to particular data, the storage system utilizes metadata pertaining to the location where the data is stored in order to handle the IO requests. If such metadata is in the cache (e.g., the metadata cache 144), it is immediately available for use. However, if the required metadata is not in the cache, the metadata pages must first be read from the storage drives (e.g., the storage devices 146). This adds latency to the IO processing, and reduces performance. It is noted that this metadata is used for both reads and writes. Furthermore, even when a storage architecture does not overwrite in-place, the original metadata is still required as input for creation of a new copy.

A "blind update" storage architecture attempts to avoid the need to read metadata for writes. In the blind update storage architecture, instead of updating the existing metadata, delta-based metadata is written which is eventually merged with the existing metadata. One of the key implications of such an architecture is that changes to capacity utilization counters are not known at the time of the write. The structures handling this metadata have an internal propagation process that, over time, leads to consolidation of utilization counters at some unknown point in the future.

Storage systems are configured to provide information (e.g., to users) about the capacity status of various storage objects, such as volumes, storage pools, clusters, etc. Such information may include capacity counters, including capacity counters for: the size of the storage object, the amount used, and how much is actually stored on the storage devices (as the "stored" value may differ from the "used" value when data reduction techniques are employed). Each host-write into the storage system may change the values of the capacity counters, depending on what was previously written to the volume.

In addition to the various capacity counters, storage systems which implement space efficient snapshotting functionality may include additional counters (e.g., snapshot savings counters), which increases the complexity of implementation when using the blind update storage architecture. Space efficient snapshot implementations create a volume tree (e.g., vtree) of dependent nodes, where each node represents a volume or snapshot. The relationships between the nodes are used during a host read to obtain metadata from a parent (or ancestor) node. If a child node does not contain any metadata at the offset location requested by the read, the data is looked for in the parent node. The parent node may also not have any information about the requested offset location, in which case the search continues up the volume tree to the next parent node, potentially repeating until reaching the volume tree's root node. The calculation of capacity counters should factor in these relationships as well.

Storage systems which implement a blind update storage architecture do not have information about what was previously written to a particular location (also referred to as an offset or offset location) in a volume. Suppose, for example, that a write W1 is written to a location or offset L1. In this case, a "logical used" capacity counter should be incremented only if L1 does not contain any previous data. Without knowing what L1 previously contained, it is unknown if the "logical used" capacity counter should be updated or not. Additionally, values of other capacity counters such as "physical used" and "compression ratio" may also need to be updated. The new value of the "physical used" capacity counter, for example, is the size of W1 after data reduction, and after subtracting the size after data reduction of the previous or existing data at location L1. Without knowing the size of the previous or existing data, a new value for the "physical used" capacity counter (as well as other capacity counters described above) cannot be determined.

Illustrative embodiments provide functionality for optimizing or improving performance of storage systems through sampling-based tracking of capacity utilization, including for storage systems implementing a blind update storage architecture. Such functionality is provided, in some embodiments, via the write sampling logic 117 and the sampling-based storage capacity tracking logic 119. The write sampling logic 117 is configured to sample incoming writes to the data storage system 130. The sampling may be based on volume identifiers (IDs) and offsets of the incoming writes, with a sampling rate that is based on volume size. The sampling-based storage capacity tracking logic 119 is configured, for the sampled writes, to read all relevant metadata and determine any corresponding changes in one or more capacity counters of the data storage system 130. Such changes from the sampled writes are then extrapolated to determine estimates for the overall capacity counters for the data storage system 130.

Any sampling algorithm involves a degree of inaccuracy. In some embodiments, the accuracy of the sampling is at the volume granularity. Therefore, sampling should also be at the volume granularity. A sample is a range within the volume, such as 8 kilobytes (KB). The sampling rate increases as the size of the volume decreases. To balance out the sampling rate between accuracy and performance, reduced accuracy may be used for smaller volumes and increased accuracy may be used for larger volumes. The overall accuracy of all the volumes in a storage pool or storage cluster is more accurate, because of the aggregation of all the samples for all the volumes. Consider, as an example, a confidence of 95% and a margin of error of 5%. With these confidence and margin of error values, approximately 400 samples are needed. Thus, the sampling rate for an 8 GB volume, with 8 KB sample size, is 1:2000 (e.g., 8 GB/8 KB/400). Higher sampling rates have a higher performance cost, so it is desirable to balance the sampling rate and the margin of error. FIG. 2 shows a table 200 illustrating a spread of sampling rates and margins of error for different volume sizes. It should be appreciated, however, that the particular numbers and values shown in the table 200 are presented by way of example only. In other embodiments, different values and columns may be utilized.

Given a sampling rate, it remains to be determined what offsets in the volume are to be chosen as samples. In some embodiments, a random function is used to select the offsets to sample. For example, a hash function on the volume ID and the sample size (e.g., 8 KB) offset may be used: Hash (vol_id, offset), where vol_id is the volume ID and off set is the sample size offset. This prevents uniformity within a volume and across volumes. Most importantly, this means that an offset that is sampled will be repeatedly sampled. This gives the advantage of potentially having the metadata still in memory (e.g., RAM) from the previous sample, if there is a "hot" area in the volume that is written to repeatedly.

The change to each capacity counter is determined per sample and multiplied by the sampling rate. For example, assume a sample of 8 KB that compresses to 4 KB which is written to an unused location in a 128 GB volume. Further assume that the sampling rate is 1:2000. The following calculations are used for the "logical used" and "physical used" capacity counters:

$$logical\_used += 8KB * 2000 = 16MB$$

$$physical\_used += 4KB * 2000 = 8MB$$

When a volume is resized, capacity counters may be updated immediately to reflect the new volume size, which will influence a "thin provisioning" capacity counter. When the size of a volume is changed, it may or may not lead to changes in the volume's sampling rate. If the sampling rate is not changed, the existing sample locations remain the same, though going forward writes to new areas will be sampled as well. If the sampling rate is changed (e.g., using the table 200, when the size of the volume is increased beyond 1 TB), the change in the sampling rate may change the locations that are sampled even for the already existing part of the volume. All the information collected thus far remains correct, however, there may be some overhead to bring the sampled locations into memory if there are "write" hot-spots.

Capacity counters should also be updated when deleting a volume, a clone snapshot, or groups thereof. Deleting a volume leads, internally, to entries being deleted from metadata. These deletions are sampled just like IO writes are. These "deletion samples" will reduce the values of all relevant capacity counters, even though the capacity counters are much wider scoped than a single volume. For storage architectures that discard the volume's metadata without processing it, an alternative solution is to sample the volumes existing data before performing the deletion.

The technical solutions advantageously provide functionality for implementing adaptive sampling-based logic for tracking capacity counters in storage systems, including storage systems that utilize blind update storage architectures. The technical solutions allow for determining the sampling rate based on volume size, and advantageously require metadata only for a very small portion (e.g., determined based on the sampling rate) of writes, and hold metadata for write hotspots in memory. Further, each sample can advantageously be used for updating all relevant capacity counters. The capacity counters tracked utilizing the technical solutions described herein are estimates rather than actual values, and may be periodically verified by computing the actual values if desired. While sampling may be used to calculate deduplication counters in conventional approaches, such sampling is not utilizable to solve the technical challenges presented by storage systems which implement blind update storage architectures. For deduplication, a hash space is sampled not the volume's address space. The hash space sampling is indifferent to volume size and resizing. The address space sampling utilizing in some embodiments is aware of the volume size and resizing, and intelligently adapts to it.

FIG. 3 is a flow diagram of a process for storage capacity tracking in storage systems according to an exemplary embodiment of the disclosure. The process as shown in FIG. 3 includes steps 300 through 308. For purposes of illustration, the process flow of FIG. 3 will be discussed in the context of the storage node 140 of FIG. 1B.

At step 300, a plurality of write request operations directed to at least one storage volume of the data storage system 130 is monitored. The data storage system 130 may utilize a blind update storage architecture, which writes to offset locations specified by write request operations without determining existing data written to the specified offset locations. The data storage system 130 may comprise a metadata cache for storing metadata mappings between logical offset locations in the at least one storage volume and physical offset location on one or more physical storage drives of the data storage system 130.

At step 302, a subset of the plurality of write request operations is identified utilizing a sampling rate determined based at least in part on a volume size of the at least one storage volume. In some embodiments, the sampling rate is further determined based at least in part on a specified margin of error value. The subset of the plurality of write request operations may be identified based at least in part utilizing a sampling function which samples randomly from the plurality of write request operations. The sampling function may comprise a hash function that takes as input a volume identifier of the at least one storage volume and a sample size offset.

At step 304, one or more changes to one or more capacity counters for one or more portions of the at least one storage volume that are written to by the subset of the plurality of write request operations are determined. The one or more storage capacity counters may comprise one or more of: a logical used capacity counter characterizing an amount of logical data that is written; a physical used capacity counter characterizing an amount of physical data that is written after applying at least one of compression and deduplication to the logical data; a snapshot savings counter characterizing storage savings provided by space-efficient snapshot functionality of the storage system; a compression ratio counter characterizing storage savings provided by applying compression to logical data that is written to the storage system; and a deduplication ratio counter characterizing storage savings provided by applying deduplication to logical data that is written to the storage system.

At step 306, one or more estimates for one or more overall storage capacity counters for the at least one storage volume are generated based at least in part on (i) the determined one or more changes to the one or more storage capacity counters for the one or more portions of the at least one storage volume that are written to by the subset of the plurality of write request operations and (ii) the sampling rate. The FIG. 3 process may further include, responsive to resizing the at least one storage volume, determining whether to update the sampling rate. The FIG. 3 process may further include, responsive to deleting the at least one storage volume, determining one or more changes to one or more storage capacity counters for the storage system based at least in part on sampling deletion at the sampling rate.

At step 308, one or more characteristics of the storage system are adjusted based at least in part on the generated estimates for the one or more overall storage capacity counters. This may include, for example, running deduplication algorithms or garbage collection processes to free up space if the generated estimates for the one or more overall storage capacity counters are above some designated thresholds. This may also or alternatively include, for example, adding or removing storage capacity (e.g., adding or removing physical storage devices) if the generated estimates for the one or more overall storage capacity counters are above or below some designated thresholds. This may further or alternatively include, for example, updating or determining actual (rather than estimated) storage capacity counters if the generated estimates for the one or more overall storage capacity counters are above or below some designated thresholds. Various other examples are possible.

The particular processing operations and other system functionality described above in conjunction with the flow diagram of FIG. 3 are presented by way of illustrative examples only, and should not be construed as limiting the scope of the disclosure in any way. Alternative embodiments can use other types of processing operations for implementing functionality for distribution of copies of metadata associated with processing groups among storage nodes of a data storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 3 can be implemented at least in part in the form of one or more software programs stored in memory and executed by a processor of a processing device such as a computer or server.

Figure 4:
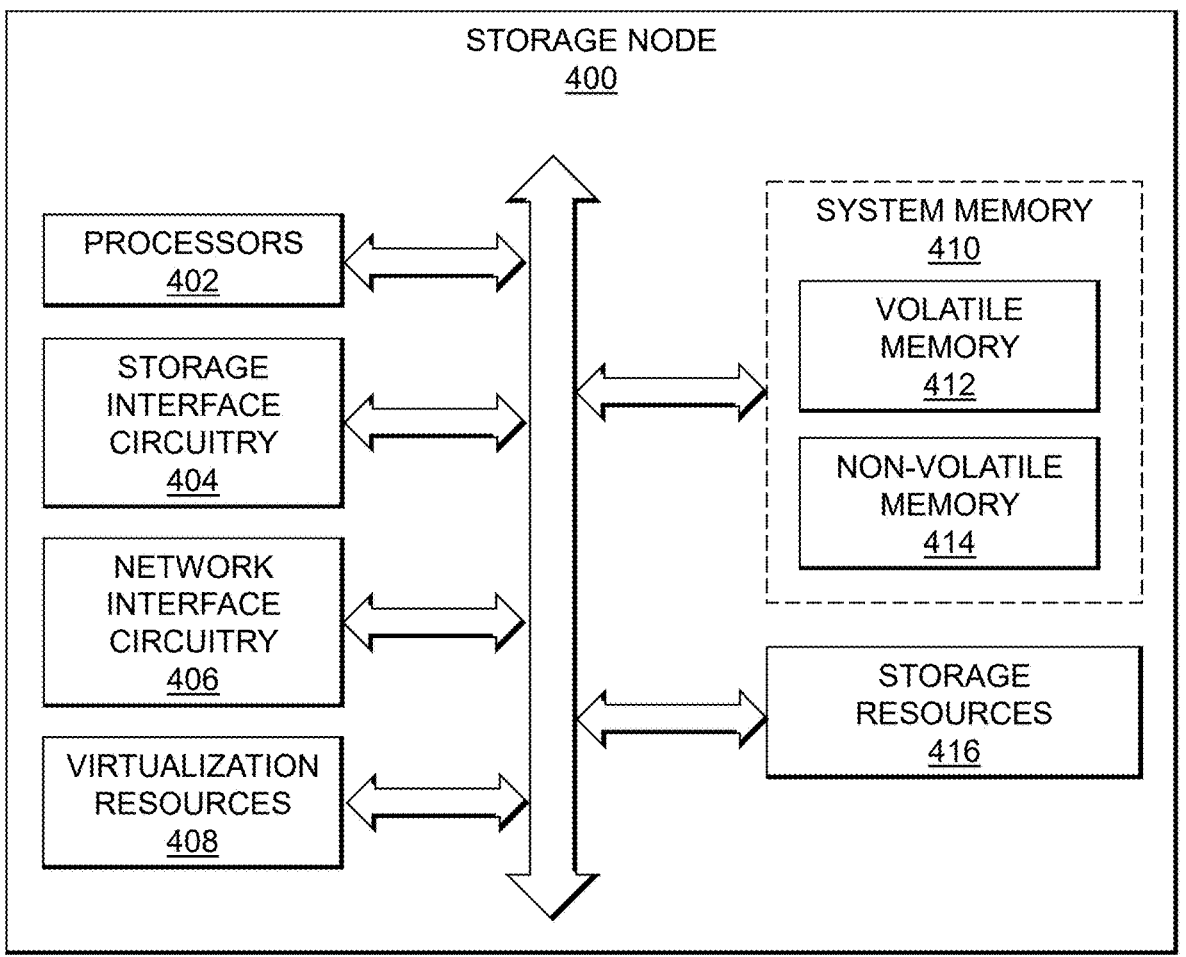
FIG. 4 schematically illustrates an example framework of a storage node for implementing a storage node of a storage system in illustrative embodiments.

FIG. 4 schematically illustrates a framework of a storage node 400 (e.g., one or more the compute nodes 110, the management nodes 115 and/or storage nodes 140 in the information processing system 100 of FIGS. 1A and 1B) which can be implemented for hosting a storage control system (e.g., the storage controllers 142, FIG. 1B). The storage node 400 comprises processors 402, storage interface circuitry 404, network interface circuitry 406, virtualization resources 408, system memory 410, and storage resources 416. The system memory 410 comprises volatile memory 412 and non-volatile memory 414.

The processors 402 comprise one or more types of hardware processors that are configured to process program instructions and data to execute a native operating system (OS) and applications that run on the storage node 400. For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the storage node 400 to interface and communicate with a network and other system components. The network interface circuitry 406 comprises network controllers such as network cards and resources (e.g., network interface controllers (NICs) including SmartNICs, RDMA-enabled NICs, etc., Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the storage node 400. For example, the virtualization resources 408 can be configured to implement the various modules and functionalities of the storage controllers 142 as shown in FIG. 1B as discussed herein. In some embodiments, the virtualization resources 408 comprise virtual machines that are implemented using a hypervisor platform which executes on the storage node 400, wherein one or more virtual machines can be instantiated to execute functions of the storage node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the storage node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the storage node 400 as well as execute one or more of the various modules and functionalities of the storage controllers 142 of FIG. 1B as discussed herein. In yet other embodiments, containers may be used in combination with other virtualization infrastructure such as virtual machines implemented using a hypervisor, such as where Docker containers or other types of LXCs are configured to run on virtual machines in a multi-tenant environment.

In some embodiments, the various components, systems, and modules of the storage controllers 142 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module)), or other forms of volatile RAM. The non-volatile memory 414 may comprise one or more of NAND Flash storage devices, SSD devices, or other types of next generation non-volatile memory (NGNVM) devices. The system memory 410 can be implemented using a hierarchical memory tier structure wherein the volatile memory 412 is configured as the highest-level memory tier, and the non-volatile memory 414 (and other additional non-volatile memory devices which comprise storage-class memory) is configured as a lower level memory tier which is utilized as a high-speed load/store non-volatile memory device on a processor memory bus (e.g., data is accessed with loads and stores, instead of with IO reads and writes). The term "memory" or "system memory" as used herein refers to volatile and/or non-volatile memory which is utilized to store application program instructions that are read and processed by the processors 402 to execute a native operating system and one or more applications or processes hosted by the storage node 400, and to temporarily store data that is utilized and/or generated by the native OS and application programs and processes running on the storage node 400. The storage resources 416 can include one or more HDDs, SSD storage devices, etc.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to monitor a plurality of write request operations directed to at least one storage volume of a storage system;

to identify, utilizing (i) a sampling rate determined based at least in part on a volume size of the at least one storage volume and (ii) a sampling function that takes as input a volume identifier of the at least one storage volume and a sample size offset, a subset of the plurality of write request operations;

to determine one or more changes to one or more storage capacity counters for one or more portions of the at least one storage volume that are written to by the subset of the plurality of write request operations;

to generate one or more estimates for one or more overall storage capacity counters for the at least one storage volume based at least in part on (i) the determined one or more changes to the one or more storage capacity counters for the one or more portions of the at least one storage volume that are written to by the subset of the plurality of write request operations and (ii) the sampling rate; and to adjust one or more characteristics of the storage system based at least in part on the generated estimates for the one or more overall storage capacity counters.

2. The apparatus of claim 1 wherein the storage system utilizes a blind update storage architecture.

3. The apparatus of claim 2 wherein the blind update storage architecture writes to offset locations specified by write request operations without determining existing data written to the specified offset locations.

4. The apparatus of claim 2 wherein the blind update storage architecture writes delta-based metadata for the write request operations in place of updating existing metadata for data written by the write request operations.

5. The apparatus of claim 1 wherein the storage system comprises a metadata cache for storing metadata mappings between logical offset locations in the at least one storage volume and physical offset location on one or more physical storage drives of the storage system.

6. The apparatus of claim 1 wherein the sampling rate is further determined based at least in part on a specified margin of error value.

7. The apparatus of claim 1 wherein the one or more storage capacity counters comprise:

a logical used capacity counter characterizing an amount of logical data that is written; and a physical used capacity counter characterizing an amount of physical data that is written after applying at least one of compression and deduplication to the logical data.

8. The apparatus of claim 1 wherein the one or more storage capacity counters comprise a snapshot savings counter characterizing storage savings provided by space-efficient snapshot functionality of the storage system.

9. The apparatus of claim 1 wherein the one or more storage capacity counters comprise a compression ratio counter characterizing storage savings provided by applying compression to logical data that is written to the storage system.

10. The apparatus of claim 1 wherein the one or more storage capacity counters comprise a deduplication ratio counter characterizing storage savings provided by applying deduplication to logical data that is written to the storage system.

11. The apparatus of claim 1 wherein the sampling function samples randomly from the plurality of write request operations.

12. The apparatus of claim 1 wherein the sampling function comprises a hash function that takes as input the volume identifier of the at least one storage volume and the sample size offset.

13. The apparatus of claim 1 wherein the at least one processing device is configured;

to detect resizing of the at least one storage volume; and to determine whether to update the sampling rate based at least in part on the detected resizing of the at least one storage volume.

14. The apparatus of claim 1 wherein the at least one processing device is configured to determine one or more changes to one or more storage capacity counters for the storage system based at least in part on sampling a plurality of deletion request operations at the identified sampling rate.

15. A computer program product comprising a non-transitory processor-readable storage medium having stored therein program code of one or more software programs, wherein the program code when executed by at least one processing device causes the at least one processing device:

to monitor a plurality of write request operations directed to at least one storage volume of a storage system;

to identify, utilizing (i) a sampling rate determined based at least in part on a volume size of the at least one storage volume and (ii) a sampling function that takes as input a volume identifier of the at least one storage volume and a sample size offset, a subset of the plurality of write request operations;

to determine one or more changes to one or more storage capacity counters for one or more portions of the at least one storage volume that are written to by the subset of the plurality of write request operations;

to generate one or more estimates for one or more overall storage capacity counters for the at least one storage volume based at least in part on (i) the determined one or more changes to the one or more storage capacity counters for the one or more portions of the at least one storage volume that are written to by the subset of the plurality of write request operations and (ii) the sampling rate; and to adjust one or more characteristics of the storage system based at least in part on the generated estimates for the one or more overall storage capacity counters.

16. The computer program product of claim 15 wherein the storage system utilizes a blind update storage architecture.

17. The computer program product of claim 15 wherein the sampling function comprises a hash function that takes as input the volume identifier of the at least one storage volume and the sample size offset.

18. A method comprising:

monitoring a plurality of write request operations directed to at least one storage volume of a storage system;

identifying, utilizing (i) a sampling rate determined based at least in part on a volume size of the at least one storage volume and (ii) a sampling function that takes as input a volume identifier of the at least one storage volume and a sample size offset, a subset of the plurality of write request operations;

determining one or more changes to one or more storage capacity counters for one or more portions of the at least one storage volume that are written to by the subset of the plurality of write request operations;

generating one or more estimates for one or more overall storage capacity counters for the at least one storage volume based at least in part on (i) the determined one or more changes to the one or more storage capacity counters for the one or more portions of the at least one storage volume that are written to by the subset of the plurality of write request operations and (ii) the sampling rate; and adjusting one or more characteristics of the storage system based at least in part on the generated estimates for the one or more overall storage capacity counters;

wherein the method is performed by at least one processing device comprising a processor coupled to a memory.

19. The method of claim 18 wherein the storage system utilizes a blind update storage architecture.

20. The method of claim 18 wherein the sampling function comprises a hash function that takes as input the volume identifier of the at least one storage volume and the sample size offset.

* * * * *